US012747052B2

(12) United States Patent
Culig et al.

(10) Patent No.: US 12,747,052 B2
(45) Date of Patent: Sep. 29, 2026

(54) PORTABLE VACUUM PUMP WITH PROTECTION AGAINST SUCTION OF LIQUIDS

(71) Applicants: ZWILLING J.A. HENCKELS AG, Solingen (DE); STATUS D.O.O. METLIKA, Metlika (SI)

(72) Inventors: Marko Culig, Metlika (SL); Yangmin Hu, Shenzhen City (CN)

(73) Assignees: STATUS D.O.O. METLIKA, Metlika (SI); ZWILLING J.A. HENCKELS AG, Solingen (DE)

( * ) Notice: Subject to any disclaimer, the term of this patent is extended or adjusted under 35 U.S.C. 154(b) by 0 days.

(21) Appl. No.: 19/113,333

(22) PCT Filed: Sep. 19, 2022

(86) PCT No.: PCT/EP2022/075993

§ 371 (c)(1),
(2) Date: Mar. 19, 2025

(87) PCT Pub. No.: WO2024/061441

PCT Pub. Date: Mar. 28, 2024

(65) Prior Publication Data

US 2026/0109500 A1 Apr. 23, 2026

(51) Int. Cl.

*B65B 31/00* (2006.01)
*B65B 57/00* (2006.01)
*G01N 27/07* (2006.01)

(52) U.S. Cl.

CPC .............. *B65B 31/00* (2013.01); *B65B 57/00* (2013.01); *G01N 27/07* (2013.01)

(58) Field of Classification Search

CPC ......... B65B 31/00; B65B 57/00; B65B 57/18; B65B 57/16; G01N 27/07

(Continued)

(56) References Cited

U.S. PATENT DOCUMENTS

2004/0149947 A1* 8/2004 Grill ........................ F16K 31/05 251/129.05
2005/0039420 A1* 2/2005 Albritton ................ B65B 31/00 53/374.9

(Continued)

FOREIGN PATENT DOCUMENTS

CN 209284904 8/2019
CN 211380737 9/2020

(Continued)

OTHER PUBLICATIONS

International Search Report and Written Opinion of the International Searching Authority from corresponding Patent Cooperation Treaty (PCT) Application No. PCT/EP2022/075993, mailed Mar. 14, 2023.

*Primary Examiner* — Jacob A Smith
(74) *Attorney, Agent, or Firm* — Gardner, Linn, Burkhart & Ondersma LLP

(57) ABSTRACT

A portable vacuum pump with protection against suction of liquids includes at least two sensors for sensing liquid at the entry of an air suction channel of the pump. The sensors are connected to a controller of the pump that is arranged to terminate pumping (vacuuming) upon sensing liquid with the sensor. The two sensors are arranged at a suitable distance in order to receive at least a droplet of liquid. As the liquid is electrically conductive, a circuit between the sensors and electronics is closed, thus signalling the electronics of the controller to stop operation of the pump and consequently air suction is terminated. Alternatively, one liquid sensor is used, shaped as a metal element installed in a groove of a housing under a plastic plate via which conductivity of a possible liquid is detected. Once detected the metal element communicates with a PCBA configured to terminate air suction.

16 Claims, 7 Drawing Sheets

(58) Field of Classification Search
USPC .............................................................. 53/52
See application file for complete search history.

(56) References Cited

U.S. PATENT DOCUMENTS

| | | | |
|---|---|---|---|
| 2014/0109511 | A1 | 4/2014 | Hammad |
| 2016/0280406 | A1 | 9/2016 | Chierchia et al. |

FOREIGN PATENT DOCUMENTS

| | | |
|---|---|---|
| CN | 212638057 | 3/2021 |
| WO | 2008112093 | 9/2008 |
| WO | 2018147813 | 8/2018 |
| WO | 2019141020 | 7/2019 |

* cited by examiner

PORTABLE VACUUM PUMP WITH PROTECTION AGAINST SUCTION OF LIQUIDS

CROSS REFERENCE TO RELATED APPLICATION

The present application is a § 371 national stage of International Application PCT/EP2022/075993, filed Sep. 19, 2022, which is hereby incorporated herein by reference in its entirety.

FIELD

The present invention belongs to the field of household appliances, particularly to the field of devices and methods for storing food in vacuum. More precisely, the invention belongs to the field of vacuum pumps for creating negative pressure in vacuum containers, vacuum bags, and containers with universal vacuum lids. The invention relates to a portable vacuum pump with protection against suction of liquids.

BACKGROUND

Storing food in vacuum is known to be a natural method of storage, as it does not use any preservatives for prolonging the shelf life of food. Vacuum containers and similar systems are well known in the market, wherein during last few years vacuuming is increasingly performed with transportable electric pumps, which are useful and quick in the process of creating vacuum inside food containers.

A problem of transportable vacuum pumps is in that they are likely to suck in liquids, which hampers operation of the complicated system of suction valves, thus causing the pump to become partly or completely useless. This issue is even more pronounced if sticky liquids, oil, marinades and similar are sucked in. As vacuum pumps are not only used with vacuum containers, but also with bags, the problem of liquid suction is even more obvious, as even a small amount of liquid present in the bag is able to enter the pump and impairs its operation.

Several different vacuum pumps are known, wherein some are autonomous and some are installed in complicated systems such as laboratory vacuuming devices and professional vacuum machines. These systems are particularly adapted to prevent suction of liquids, but are not useful for everyday and home use. Therefore, they differ from the present invention in the construction and operation.

Patent application WO2018147813 discloses a device for vacuum sealing glass and plastic containers with lids for storing food, which comprises a flexible valve and a hand vacuum pump with an integrated dagger for penetrating a metal or plastic lid of a container. The latter has a housing, inside which a movable part with a handle comprising an integrated dagger for penetrating a metal or plastic lid of a container are installed. The interior of the movable part is provided with a space for housing a larger number of the valves. This solution does not prevent suction of liquids; hence, it is still susceptible for malfunctions due to sucked liquids.

Some solutions prevent entering of liquids into vacuum pumps by using mechanical barriers. For example, utility model CN209284904 discloses a vacuumizing device comprising a vacuum pump, an air suction port, and an air outlet, wherein a waterproof breathable film capable of preventing liquid from being pumped into the vacuum pump is arranged in the extraction opening. Similarly, utility model CN212638057 discloses a gas-liquid separation device for food vacuum packaging equipment, which is provided with a water separation mechanism.

Patent application WO2008112093A1 describes a vacuum food storage device having a container, a lid, a pump to evacuate air, a switch engageable by contact of the pump to the lid to permit the pump to evacuate air from the container to a desire degree of vacuum. A sensor disengages the pump when a desired vacuum is achieved, and a timer disengages the pump after a predetermined time. When air is evacuated from the container by the vacuum pump, it travels from the container interior through a mesh screen, a filter, a chamber and out through a tube. Thus, liquid is trapped by the mesh screen and the filter, so that they do not damage the pump.

On the other hand, patent application U.S. Publication No. 2014/109511, which describes vacuum packaging and sealing appliance with liquid detection, comprises a humidity sensor in the exhaust of the vacuum pump to detect the presence of liquid drawn into the vacuum trough during vacuum sealing, rather than relying on physical barriers. The sensor is electrically connected to the control unit and send electrical signals to the control unit. Based upon the electrical signals, the control unit controls one or both of the vacuum motor assembly and the at least one heat sealing element.

SUMMARY

A portable vacuum pump is provided that can limit or prevent suction of liquids from any kind of storage container, bag or other vessels. The construction enables easy and efficient cleaning, while ensuring that the whole device remains portable and compactly designed.

The essence of the portable vacuum pump with protection against suction of liquids is in that it is provided with at least two sensors for sensing liquid at the entry of an air suction channel of the pump, wherein the sensors are connected to a controller (electronics) of the pump arranged to terminate pumping (vacuuming) upon sensing liquid with the sensor. The sensors may be electrically conductive in order to allow closure of an electrical circuit upon contact with liquid and thus termination of pumping.

An alternative and equally functioning solution to the technical problem represents use of at least one sensor for sensing liquid, which comprises a housing with a groove, inside which a metal element, such as shaped as a spring, is installed, wherein the metal element is placed in the groove ending with a plastic plate of the housing. The metal element, such as a spring, can sense conductivity of a possibly present liquid in vacuumed air in the suction channel via the plastic plate. If liquid is detected, the metal element is configured to communicate with a controller, usually a Printed Circuit Board Assembly (PCBA), which is arranged to terminate air suction immediately after detecting liquid. The metal element may be connected to the controller, usually by soldering the metal element to the PCBA. Hence, no connecting cables or similar equipment is needed. This embodiment is sensitive, as the metal element, i.e. spring, can easily detect the liquid if present.

The vacuum pump may include:

- a housing having at least one opening for connection with a suitable valve, opening or any other structure that allows vacuum storing in suitable vacuum vessels, containers, bags and similar, wherein the inside the housing at least the following components are provided:

- a pump for pumping air (vacuuming), the pump being powered by a suitable motor and a power source, such as a replaceable or a rechargeable battery,
- a suction channel starting at the opening of the housing and extending into the housing interior for ensuring a pathway along which air is sucked into the interior of the vacuum pump, wherein the suction channel may be provided approximately in the centre of the housing interior,
- at least one sensor with the metal element or at least two sensors for sensing liquid provided at the entry of the suction channel close to the contact with a valve of vacuum containers, bags or other vessels, wherein the sensors are arranged at a distance suitable to receive a droplet of liquid,
- for the embodiment with at least two sensors, connecting cables or wires for connecting the at least one sensor with the controller of the device, usually electronics arranged to terminate pumping upon sensing liquid with the sensor, and
- a removable cover of the housing protecting the suction channel and the sensors against environmental conditions, wherein the removal of the cover enables access to the sensors for maintenance.

The two sensors are arranged at a suitable distance in order to receive at least a droplet of liquid. The suitable distance may be in the range from 1 μm to 5 cm, more preferably in the range from 0.5 mm to 0.5 cm, optimally from 1 to 2 mm. The shape of sensors is arbitrary, such as rods and plates. As the liquid is electrically conductive, current circuit is closed, thus signalling the electronics to stop operation of the pump and consequently air suction. The sensors are made from a suitable electrically conductive material, such as nickel-plated brass. Connecting cables or wires for connecting each of the sensors with the controller of the device, usually electronics, are also made from conductive material and are connected to the sensors and electronics in any suitable manner known to a skilled person. The wires or cables may be placed in any part of the vacuum pump, wherein one such position is along the sides of the pump and towards the sensors on one end and towards the electronics on the second end.

The shape of the opening of the housing, the air suction channel and the dimensions of sensors is arbitrary, however, a sufficiently small distance between sensors has to be ensured that even a very small liquid droplet in contact with the sensors is able to close the circuit and cause termination of air suction (vacuuming) as described above.

In case a liquid droplet is caught between the sensors or sensed by the single sensor with the metal element leading to the pump being stopped, the pump has to be reset, i.e., the sensors have to be dry in order to allow operation of the device. In order to achieve this, a user has to remove the removable cover, thus gaining access to the sensors at the entry into the suction channel. The sensors are then dried in any known manner, normally by wiping with a dry absorbent material or air drying, which results in the circuit between the sensors and electronics being open. Upon closure of the removable cover the device may be used again. The removable cover thus enables easy and fast maintenance of the device with a simple access to the sensors, which does not require removal of any further elements or opening of the housing.

The removable cover may be designed in any suitable manner, such as in the form of a silicon sealing piece or a plastic holder with a seal, wherein the housing and the cover or the holder, respectively, are provided with corresponding structures for closure, such as threads, click-closure, pins and holes, and similar. In case of silicon sealing piece, the corresponding structures are not necessary, as the material and the shape of the sealing piece ensure reliable fit in the opening of the housing.

The pump may be provided with known components enabling operation of the pump for air suction, namely suitable seals in order to achieve negative pressure inside the housing, etc. These components are known to the skilled person and represent usual design of portable vacuum pumps.

The vacuum pump disclosed herein efficiently prevents suction of liquids into the pump, thus ensuring is long lifespan and preventing damage to the pump. It can be used with any kind of vacuum container, vacuum bag, or any other suitable vessel for storing food or other items.

These and other objects, advantages, purposes and features of the present invention will become apparent upon review of the following specification in conjunction with the drawings.

BRIEF DESCRIPTION OF THE DRAWINGS

A vacuum pump with protection against suction of liquids will be described in further detail based on an exemplary embodiment and figures, which show.

DETAILED DESCRIPTION

Figure 1:
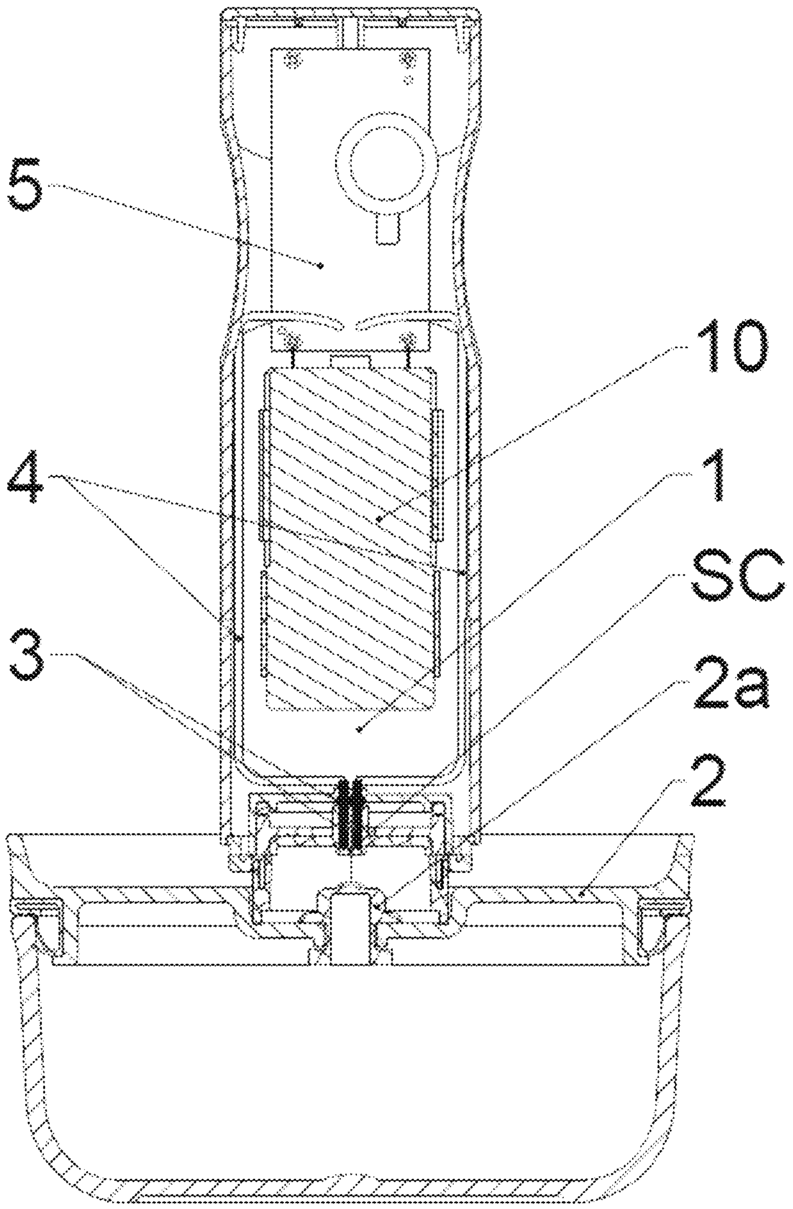
FIG. 1 is a side sectional view of vacuum pump according to a possible embodiment installed on a vacuum container.

Referring now to the drawings and the illustrative embodiments depicted therein, a vacuum pump according to a possible embodiment comprises a housing with a bottom opening, wherein in the interior 1 of the housing the following components are provided:

- a pump 10 for pumping air (vacuuming) being powered by a suitable motor and a power source,
- a suction channel SC located in the housing interior,
- two sensors 3 for sensing liquid provided at the entry of the suction channel near the contact with a valve of vacuum containers or bags,
- connecting cables 4 or wires for connecting the at least one sensor 3 with the controller of the device, usually electronics 5 arranged to terminate pumping upon sensing liquid with the sensor 3, wherein the connecting wires have ends 4*a* in contact with the electronics 5, a removable cover comprising a holder 9 for a seal 8 and the seal 8, which are installed in the bottom opening of the housing in a removable manner, so that access to the sensors 3 is possible upon removal of the holder 9.

The pump 10, connecting wires 4 and at least a part of the suction channel SC may be encased in an inner housing, which is installed inside the main housing of the vacuum pump.

Figure 2:
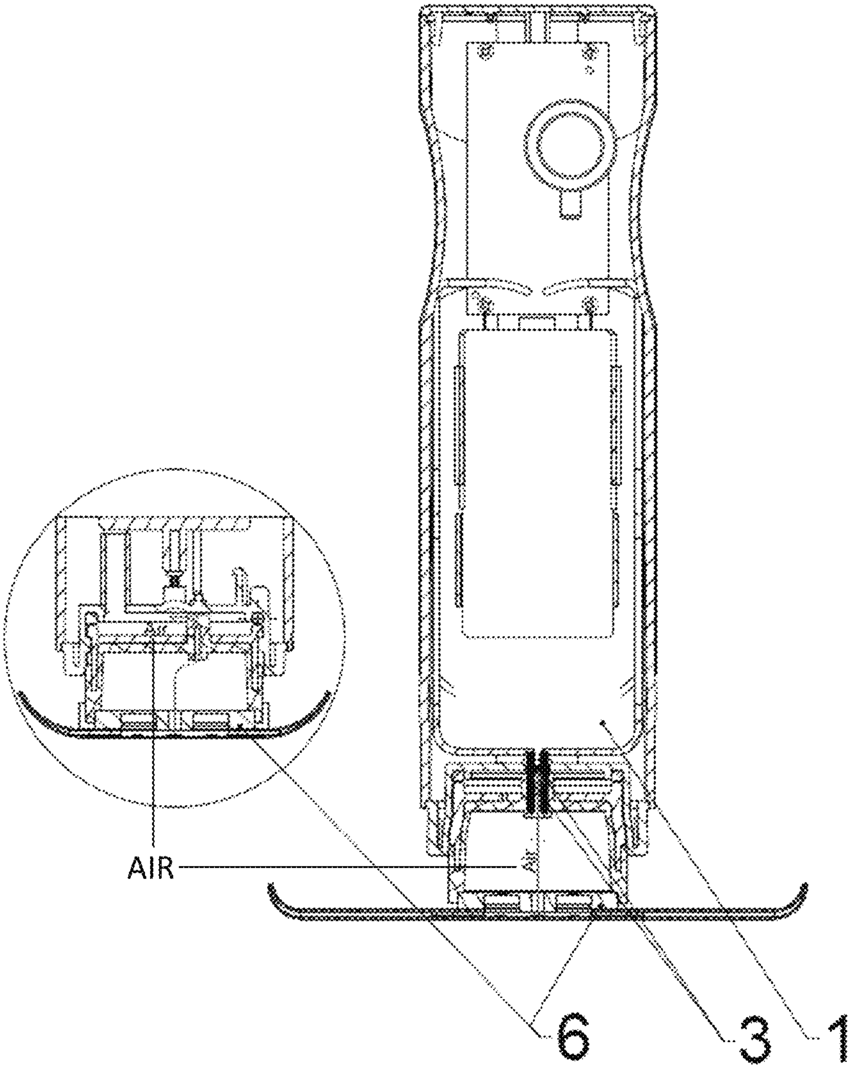
FIG. 2 is a side sectional view of a vacuum pump according to a possible embodiment installed on a vacuum bag with depicted air flow, including an enlarged inset view.

FIG. 1 shows the vacuum pump 1 installed on a vacuum container with a lid 2 comprising a valve 2*a*, while FIG. 2 shows the vacuum pump 1 installed on a valve 6 of a vacuum bag.

Figure 3:
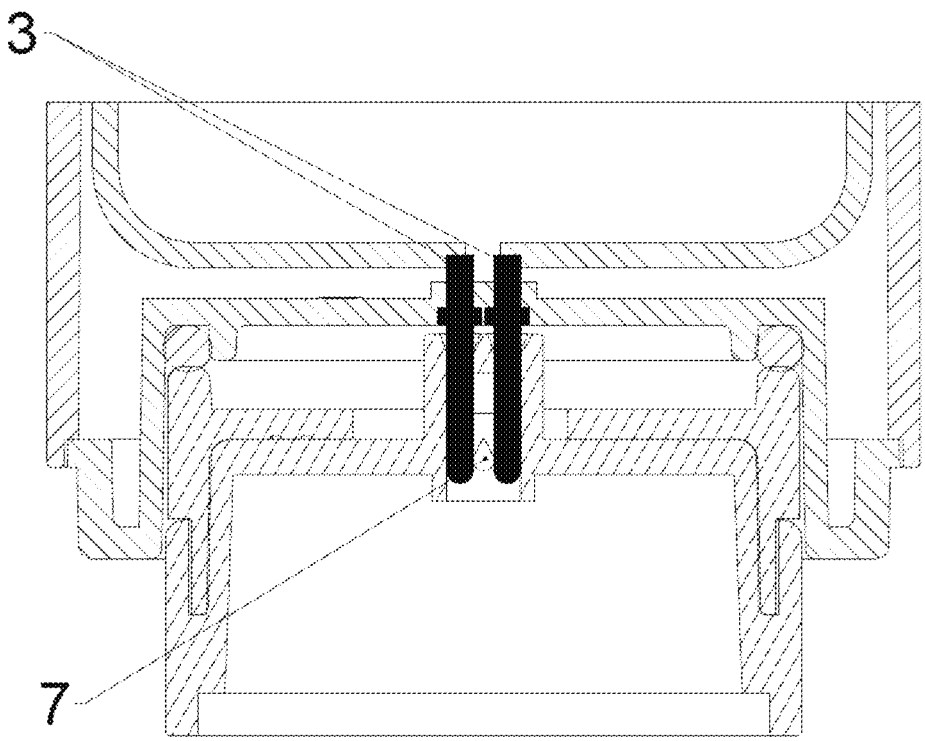
FIG. 3 is an enlarged view of a lower region of a vacuum pump according to a possible embodiment upon contact with liquid.
Figure 4:
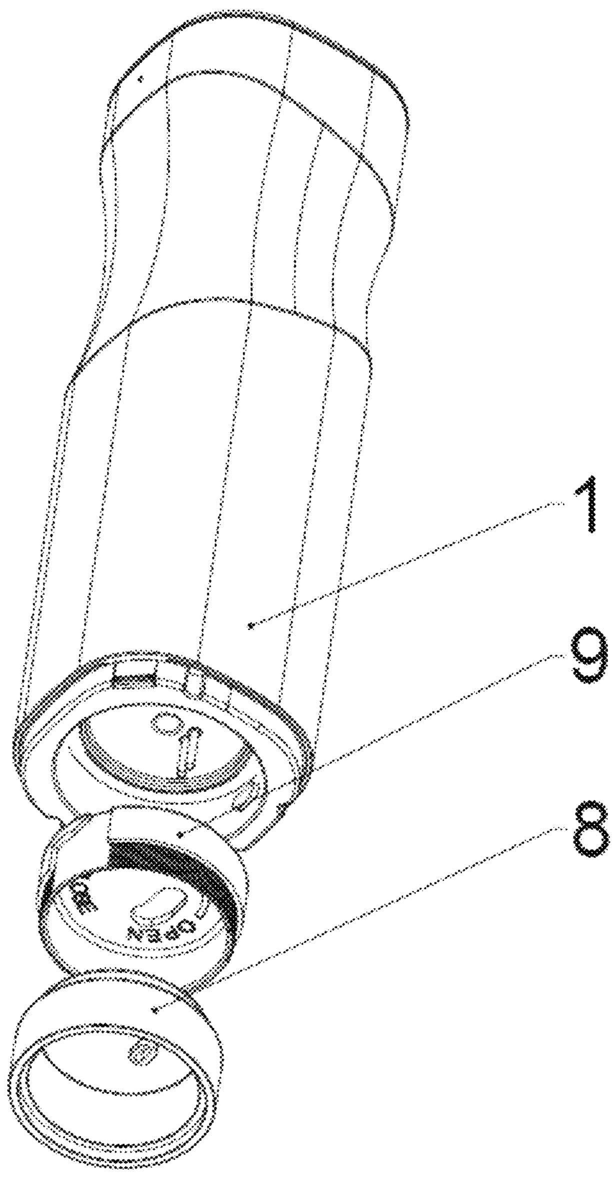
FIG. 4 is a partially exploded perspective view of a vacuum pump according to a possible embodiment.
Figure 5:
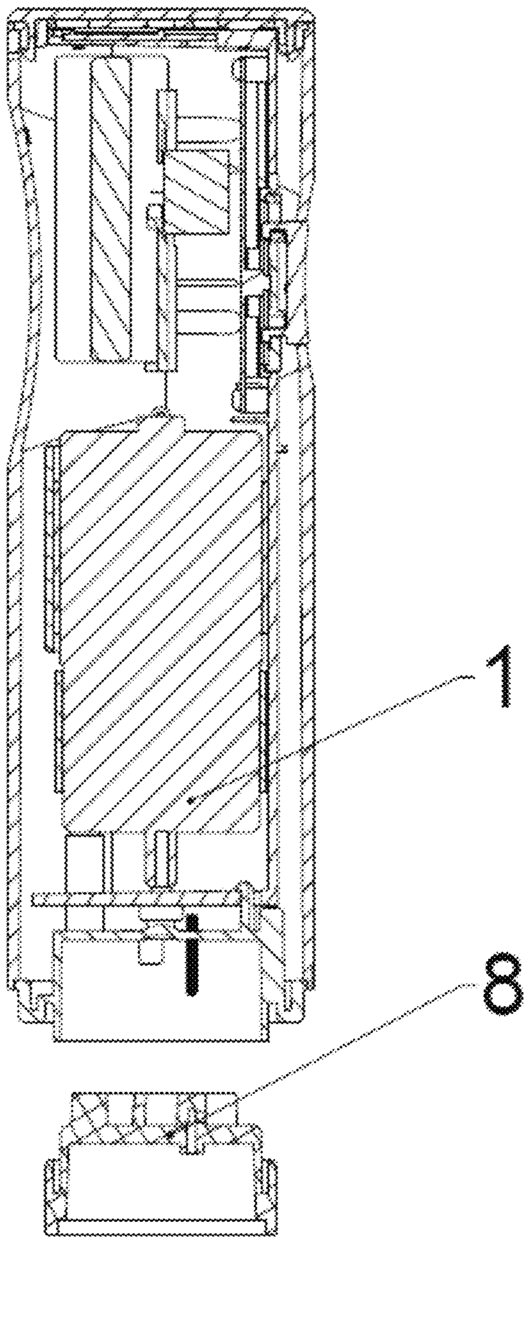
FIG. 5 is a partially exploded side sectional view of a vacuum pump according to a possible embodiment.

The vacuum pump is operated by pushing the ON/OFF button and the air is being sucked through the suction channel via the sensors 3. In case a droplet of liquid 7 is sucked from the vacuum container or a bag, it travels towards the suction channel up to the sensor 3, where it is trapped and sensed as shown in FIG. 3. A closed circuit is created due to the conductivity of the liquid, hence the electronics 5 terminate air suction and the pump ceases to operate. By terminating suction further suction of liquid is prevented and the user can clean the sensors by removing the holder 9 of the seal 8 and the seal 8 in order to gain access to the sensors 3 as shown in FIGS. 4 and 5.

These can be wiped clean or air dried and then the holder 9 with the seal 8 is returned into place. After cleaning air suction function can be turned on again and vacuuming of the vacuum container or any other vessel can proceed as before.

Figure 6:
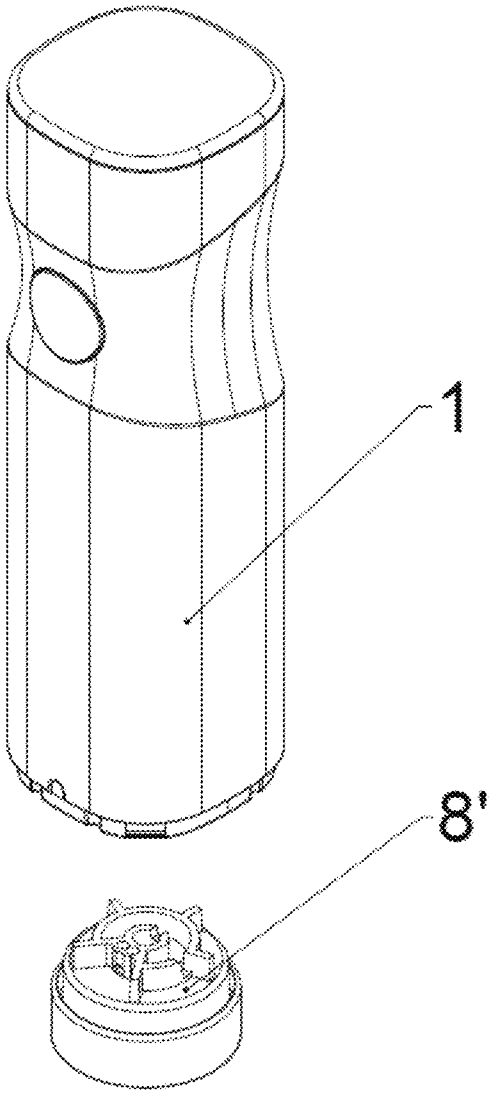
FIG. 6 is a partially exploded perspective view of a vacuum pump according to another embodiment.

Alternatively, the removable part may be designed as one piece 8', which is a silicon sealing piece that upon removal ensures access to the sensors 3 (FIG. 6). It has circular shape to fit into the opening of the housing, wherein it is provided with suitable protrusions to ensure sealing and fit into the housing of the pump. The protrusions also function as reinforcements and at the same time allow for creation of a labyrinth for air and/or possible liquid as shown in FIG. 6. The protrusions are formed as an approximately circular base with five legs pointing to the outer circumference of the removable part, while an inner circular formation is present inside the circular base. Furthermore, the function of this piece is also to ensure sealing when connected to a valve of a vacuum container, bag, or other vessel, in order to allow reliable and efficient vacuuming.

Figure 7:
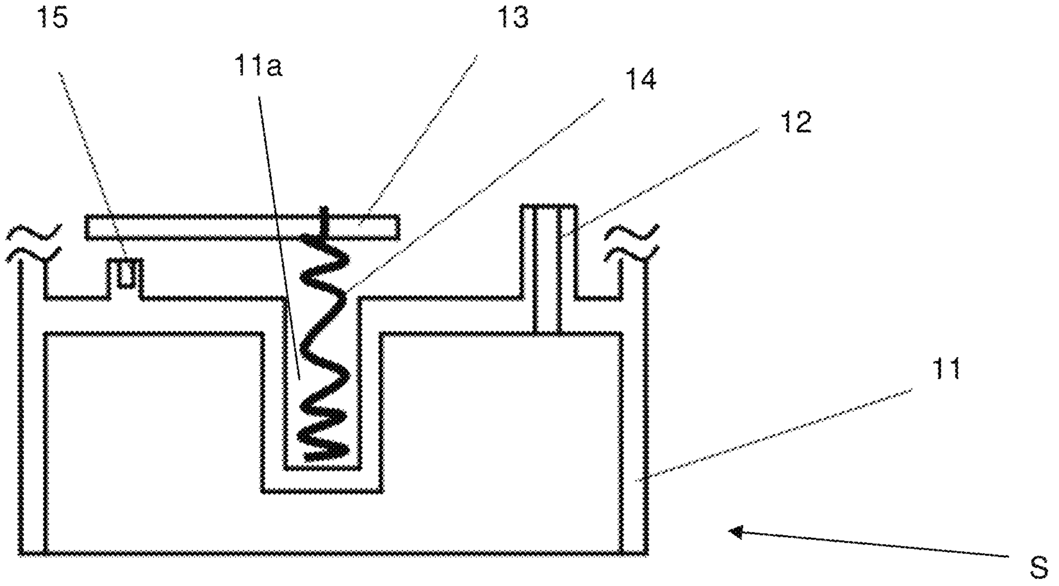
FIG. 7 is a side sectional view of a liquid sensor.

FIG. 7 depicts one such embodiment of the liquid sensor, wherein the sensor comprises a housing 11, which is essentially a plastic base part to be covered with a silicon cover (not shown), and inside the housing 11 a groove 11*a* is provided for receiving a metal spring 14 arranged to detect all conductive materials via the plastic housing or plate. The metal spring 14 is soldered on one end to a Printed Circuit Board Assembly (PCBA) 13, while the other end is installed in a groove of a housing. The metal spring is arranged to such as liquids, communicates with the PCBA 13 and the latter causes the pump to stop operating when liquid is sensed by the metal spring 14. The airflow connection nozzle 12 is provided for connection with containers which are to be vacuumed and is thus not connected with sensing of liquids. The housing is also provided with means for receiving fixing screws 15, which are located below the PCBA 13. The fixing screws 15 are intended to mount the housing of the sensor into the portable vacuum pump.

Figure 8:
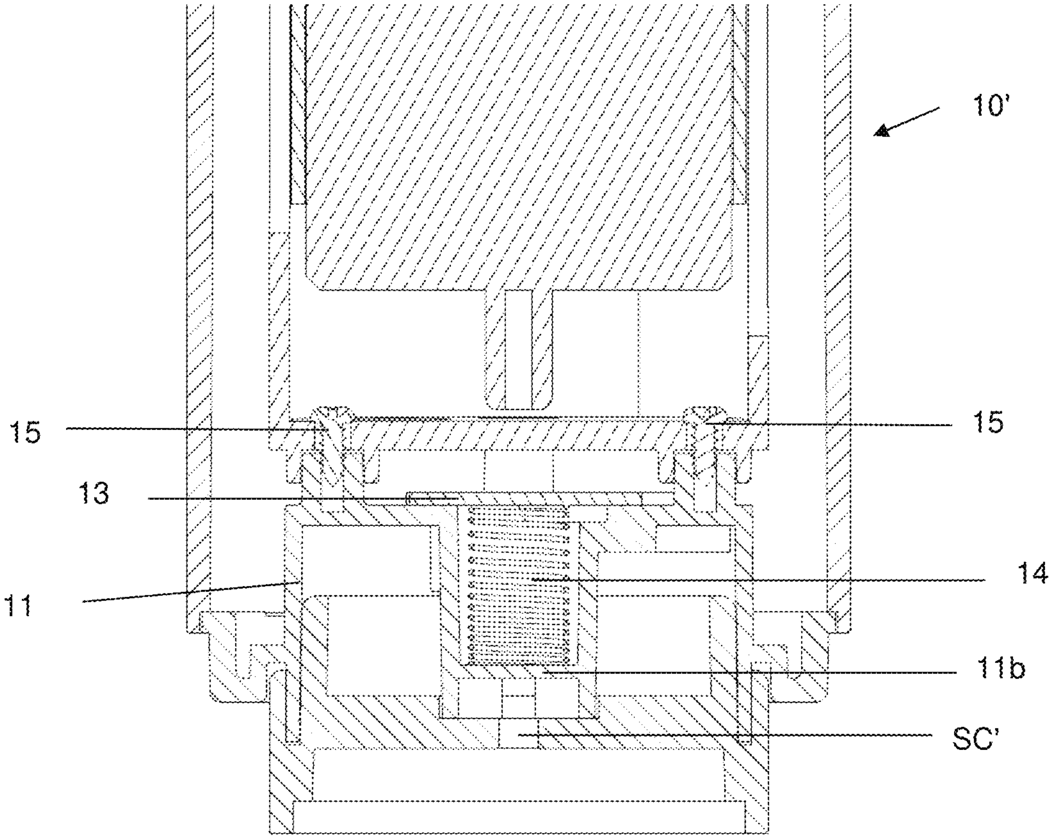
FIG. 8 is a side sectional view of a lower region of a vacuum pump including a liquid sensor.

FIG. 8 shows the pump 10' with the sensor S as shown in FIG. 7. The housing 11 is fixed onto the lower part of the vacuum pump in order to cover the part attaching to the item to be vacuumed. The metal spring 14 is present in the groove and the plastic plate 11*b* is covering the entry of an air suction channel SC' of the pump 10' so as to detect any possible liquid in the air suction channel SC' by sensing liquid conductivity.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A portable vacuum pump with protection against suction of liquids, the portable vacuum pump comprising:
- an air pump for pumping air (vacuuming), the air pump being powered by a motor and a power source;
- at least one sensor with a metal spring or at least two sensors for sensing liquid for sensing liquid at an entry of an air suction channel of the portable vacuum pump;
- a controller arranged to terminate vacuuming upon the sensors sensing liquid;
- a housing having an opening for connection with a valve or opening that allows vacuum storing in a vacuum vessel, wherein the housing contains:
  - the air suction channel starting at the opening of the housing and extending into an interior of the housing to form a pathway along which air is sucked into an interior of the air pump, wherein the air suction channel is located approximately in the centre of an interior of the housing;
  - the at least one sensor with a metal spring or the at least two sensors; and
  - the controller in communication with the at least one sensor with the metal spring or with the at least two sensors, via connecting cables or wires, wherein the controller is operable to terminate pumping upon sensing liquid with the sensor with the metal spring or with the at least two sensors;
- a removable cover of the housing protecting the air suction channel and the at least one sensor with the metal spring or the at least two sensors against environmental conditions, wherein removal of the cover enables maintenance access to the at least one sensor with the metal spring or the at least two sensors;
- wherein the removable cover is a designed as a one-piece silicon sealing piece that upon removal ensures access to the at least one sensor with the metal spring or the at least two sensors and has a circular shape to fit into the opening of the housing, wherein the sealing piece is provided with protrusions configured to ensure sealing and fit into the housing of the air pump;
- wherein the housing is provided with corresponding structures for closure; and
- wherein the at least one sensor with the metal spring or the at least two sensors are spaced apart to receive a droplet of liquid therebetween, and wherein the at least one sensor with the metal spring or the at least two sensors are connected to the controller of the air pump.

2. The portable vacuum pump with protection against suction of liquids according to claim 1, wherein the at least one sensor with the metal spring or the at least two sensors are spaced at a distance from 1 m to 5 cm.

3. The portable vacuum pump with protection against suction of liquids according to claim 2, wherein the at least one sensor with the metal spring or the at least two sensors are spaced at a distance of 0.5 mm to 0.5 cm.

4. The portable vacuum pump with protection against suction of liquids according to claim 2, wherein the at least one sensor with the metal spring or the at least two sensors are spaced at a distance of 1 mm to 2 mm.

5. The portable vacuum pump with protection against suction of liquids according to claim 1, wherein the at least one sensor with the metal spring or the at least two sensors are electrically conductive in order to allow closure of an electrical circuit upon contact with liquid and thus termination of pumping.

6. The portable vacuum pump with protection against suction of liquids according to claim 1, wherein the at least one sensor with the metal spring or the at least two sensors are made from nickel-plated brass.

7. The portable vacuum pump with protection against suction of liquids according to claim 1, wherein (i) the at least one sensor with the metal spring is shaped as a rod or plate, or (ii) the at least two sensors are shaped as rods or plates.

8. The portable vacuum pump with protection against suction of liquids according to claim 1, wherein the connecting cables or wires for connecting the at least one sensor with the metal spring or each of the at least two sensors with the controller, are made from conductive material and are connected to the at least one sensor with the metal spring or the at least two sensors and electronics of the controller.

9. The portable vacuum pump with protection against suction of liquids according to claim 8, wherein the wires or cables are located along at least one side of the air pump and towards the at least two sensors on one end and towards the electronics on another end.

10. The portable vacuum pump with protection against suction of liquids according to claim 1, wherein the protrusions form a labyrinth for air or liquid and are formed as an approximately circular base with five legs pointing to an outer circumference of the removable cover, with an inner circular formation inside the circular base.

11. The portable vacuum pump with protection against suction of liquids according to claim 1, wherein the air pump is arranged for use with a vacuum container, a vacuum bag, or a vessel for storing food items.

12. The portable vacuum pump with protection against suction of liquids according to claim 1, wherein the corresponding structures for closure comprise at least one chosen from threads, a click-closure, and pins and corresponding holes.

13. A portable vacuum pump with protection against suction of liquids, the portable vacuum pump comprising:

an air pump at an entry of an air suction channel of the portable vacuum pump;

at least one sensor at the air pump for sensing liquid, wherein the at least one sensor comprises a plastic housing defining a groove for receiving a metal element arranged to detect conductive materials of possible liquids;

the plastic housing comprising a plastic plate defining an end of the groove;

wherein the metal element has one end connected to a Printed Circuit Board Assembly (PCBA) and another end installed in the groove of the plastic housing, and the metal element is configured to sense conductivity of a possible liquid upon the possible liquid contacting the plastic plate;

a removable cover of the plastic housing, the removable cover protecting the suction channel and the at least one sensor with the metal element against environmental conditions, wherein removal of the removable cover enables access to the at least one sensor with the metal element for maintenance;

wherein the removable cover is designed as a one piece silicon sealing piece that upon removal ensures access to the at least one sensor and has a circular shape to fit into an opening of the plastic housing, wherein the sealing piece is provided with protrusions configured to ensure sealing and fit into the plastic housing.

14. The portable vacuum pump with protection against suction of liquids according to claim 13, wherein the metal element is arranged to communicate with the PCBA in case of detected liquids and the PCBA is configured to cause the air pump to stop operating when liquid is sensed by the metal element.

15. The portable vacuum pump with protection against suction of liquids according to claim 13, wherein the metal element is shaped as a spring.

16. The portable vacuum pump with protection against suction of liquids according to claim 13, wherein the air pump is arranged for use with a vacuum container, a vacuum bag, or a vessel for storing food items.

* * * * *